Patented Sept. 5, 1922.

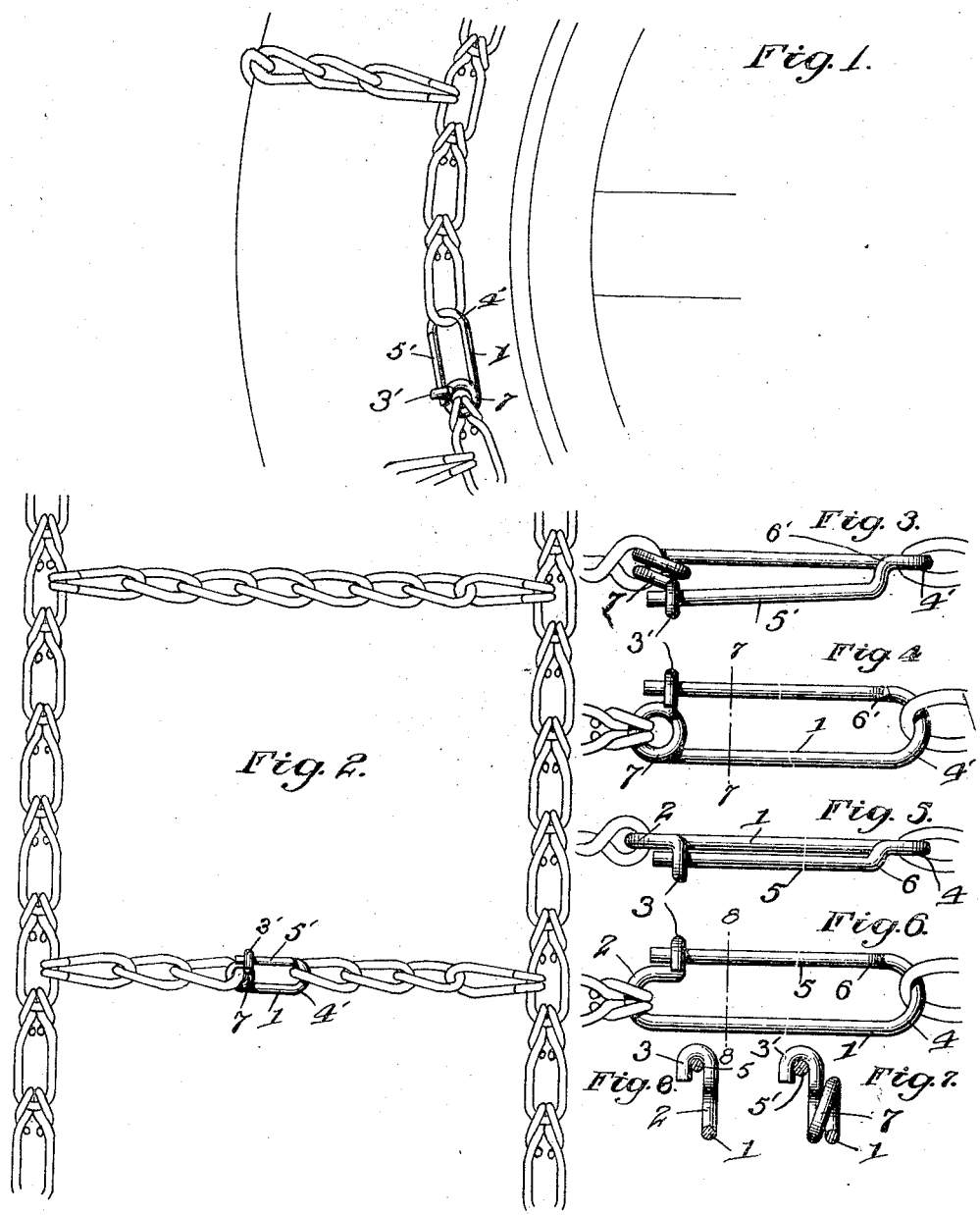

1,427,846

UNITED STATES PATENT OFFICE.

RAY DALE PULVER, OF CANTON, SOUTH DAKOTA.

FASTENING DEVICE.

Application filed February 27, 1922. Serial No. 539,582.

*To all whom it may concern:*

Be it known that I, RAY DALE PULVER, a citizen of the United States of America, residing at Canton, in the county of Lincoln and State of South Dakota, have invented certain new and useful Improvements in Fastening Devices; and I do hereby declare that the following is a full, clear, concise, and exact description of the invention, such as will enable others skilled in the art to which it appertains to make and use the same.

This invention relates to improvements in fastening devices, having for an object to provide a device which may be advantageously employed upon anti-skid chains for motor driven vehicles, whereby to provide a detachable connection between the adjacent ends of the longitudinal chains or anchoring elements thereof, and also, to afford a temporary connection between any broken portions of an anti-skid chain.

It is also an object of the invention to provide a fastening device of the character mentioned which will be of exceedingly durable and simple construction and will have the shank thereof so formed as to permit of quick engagement of the same upon its depression, in the keeper provided therefor.

It is likewise an object of the invention to provide a fastening device having means upon the shank portion thereof which will function to prevent the slipping or similar undue movement of a chain link from such shank during adjustment of the device for fastening or during fastening of the same.

Other objects will be in part obvious and in part pointed out hereinafter.

In order that the invention and its mode of operation may be readily understood by persons skilled in the art, I have in the accompanying illustrative drawings and in the detailed following description based thereon, set out several possible embodiments of the same.

In these drawings:

Figure 1 is a fragmentary detail in elevation showing the invention employed as a connector for the anchoring elements of an anti-skid construction;

Figure 2 is a fragmentary plan view wherein the invention is employed as a temporary connector or link in the traction elements of an anti-skid chain construction;

Figure 3 is a detail in top plan of the device;

Figure 4 is a side elevation of the same;

Figure 5 is a detail in plan or top view of a slightly modified form of the device;

Figure 6 is a side elevation thereof;

Figure 7 is a transverse section taken on the line 7—7 of Figure 4; and,

Figure 8 is a similar view taken on the line 8—8 of Figure 6.

Having more particular reference to the drawings, in connection with which like characters of reference will designate corresponding parts throughout, the fastening device in one of its embodiments, may be stated to comprise a single length of spring wire of suitable gauge, presenting a body portion 1 and having one end portion thereof bent upwardly into substantially U-shaped fashion as indicated at 2 and formed with a right angularly disposed downwardly opening hook or keeper 3, which, as will be noted, is disposed at substantially right angles to the looped portion 2; the opposite end of the body portion being similarly bent or looped as at 4 and extended to provide a shank 5, which, as will be noted, is offset from the upper extremity of the looped portion 4 by means of the bend indicated at 6 in order that said shank will be brought into nearer longitudinal alignment with the downwardly opening keeper 3. Thus, by reason of the lateral off-setting of the shank portion 5, the free end thereof, when in its open position will rest upon the outer side portion of the hooked keeper and by consequence, when depressed will ride downwardly over said outer portion and enter the same so that with its release, it will move upwardly into the pocket afforded by the keeper, as clearly shown in the Figure 3.

In this connection, it is to be noted that the forming of the bend 6 in the shank portion of the fastener occurs at a point slightly beyond the looped or curved end portion 4 and by consequence, provides, at this point, a pocket for receiving and retaining a link of an anti-skid chain upon which the fastening device is employed. With engagement of the link in the looped or curved end portion 4, movement of the same along or over the shank portion 5 will be prevented by reason of the bend 6, said bend offering a shoulder against which the links will abut should any stress thereupon tend to move the same onto the shank portion. Hence, the proper positioning of the chain links in the curved or looped portion 4 will be ensured, irrespective of the movement of the fastening device during its adjustment prior to fastening or even during fastening of the same. In this way, it will be understood that the right angular bend or kink 6 affords a twofold function, first, as a means for offsetting the free extremity of the shank portion 5 whereby it may be readily engaged with the hooked keeper 3 and second, to afford a stop or abutment for an automobile chain link engaged by the device and arranged in the curved or looped portion 4 thereof.

Likewise, the forming of the curved or looped end portion 2 of the fastening device corresponds, in a fashion, to the forming of the end portion 4 in that in by arranging the downwardly opening keeper at substantially right angles to the upper or free extremity of said portion 2, an abutment or stop will be afforded which will prevent displacement of the chain link moving onto the same in an outwardly direction.

In Figures 2 and 3, I have illustrated a slightly modified form of the invention and herein form upon one end of the body portion 1 of the fastening device a plurality of coils or convolutions 7, the free extremity of the material being bent at substantially right angles to provide a downwardly opening hooked keeper 3', corresponding to the keeper 3.

Because of the provision of the coiled portion 7, it will be understood that the fastening device may be more firmly or positively engaged with the chain link, by moving said link over the right angularly disposed keeper 3' and then threading it about the convolutions 7 until it is embraced thereby in the manner indicated in dotted lines. With the link so engaged in the coiled portion 7, it of course, will be appreciated that accidental displacement thereof or of the fastener with relation to the automobile anti-skid chain will be practically eliminated.

In this latter embodiment, I also laterally offset the shank portion 5' of the fastening device by forming a right angular bend or kink 6' in the upper portion of the curved end portion 4', thereby permitting the free end of the shank portion 5 to be readily engaged with the outer side of the hooked keeper 3 so that it may be readily moved into engagement with the same upon depression and likewise, to afford an effectual form of abutment or stop for a link arranged in said end portion 4', should the same tend to move outwardly onto the shank portion.

In using the improved fastening device, it will be understood that the range of adaption thereof may be widely varied, although for purposes of illustration, it will suffice to state that the devices may be effectually used as a releasable connection between the adjacent ends of the longitudinal chains or anchoring elements of an automobile anti-skid chain construction, serving in lieu of those types of hook-like connections now prevalent, but affording a more positive connection because of the positive closure affording the device when the shank portion thereof is swung downwardly so as to engage the free extremity under the keeper of the device. Also, if desired, the fastening device may be used as an auxiliary locking device in addition to the usual forms of hook-like connectors hereinbefore mentioned, one end of the device being engaged with one of the links upon one end of the longitudinal anchoring element of an anti-skid chain construction while the opposite end thereof will be engaged with a link upon the opposite end of said longitudinal anchoring element at a point beyond the connection of the hook-like connector therewith. Thus, the hook-like connector may be first engaged with the opposite end of the longitudinal anchoring element whereupon the fastening device may be then engaged with the opposite ends of said longitudinal anchoring device and closed by moving the shank portion of the same into engagement with its keeper.

Instead of being employed as a connector for the longitudinal anchoring element of an automobile anti-skid chain construction, the fastening device may be equally well used as a temporary connection in the repair of the various chains of an automobile anti-skid chain construction, the same being substituted for a broken link at any point throughout the same.

Manifestly, the construction shown is capable of considerable modification and such modification as is within the scope of my claim, I consider within the spirit of my invention.

I claim:

A fastening device of the character described comprising a body portion having one end portion coiled upon itself and the free extremity thereof bent to provide a right angularly arranged downwardly opening keeper, the opposite end of said body portion being curved upon itself into substantial U-shaped formation and having a shank portion extending therefrom adapted for engagement in said keeper, said shank portion being offset intermediate its length whereby to provide a right-angular shoulder in proximity to said last mentioned end portion of the body portion.

In witness whereof I have hereunto set my hand.

RAY DALE PULVER.